US007559726B1

(12) United States Patent  (10) Patent No.: US 7,559,726 B1
Beach  (45) Date of Patent: Jul. 14, 2009

(54) DRILL PLUG EJECTION SYSTEM

(76) Inventor: Leroy L. Beach, 109 Parkwest Cir., Easley, SC (US) 29642

( * ) Notice: Subject to any disclaimer, the term of this patent is extended or adjusted under 35 U.S.C. 154(b) by 6 days.

(21) Appl. No.: 11/850,755

(22) Filed: Sep. 6, 2007

(51) Int. Cl.
B23B 51/05 (2006.01)
(52) U.S. Cl. ........................................ 408/68; 408/206
(58) Field of Classification Search ................. 408/67, 408/68, 204–209, 703; B23B 51/04, 51/05
See application file for complete search history.

(56) References Cited

U.S. PATENT DOCUMENTS

| 3,266,346 | A | * | 8/1966 | Voissem | 408/68 |
| 3,390,596 | A | * | 7/1968 | Trevathan | 408/68 |
| 3,559,513 | A | * | 2/1971 | Hougen | 408/204 |
| 3,849,019 | A | * | 11/1974 | Green | 408/142 |
| 4,755,087 | A | | 7/1988 | Parent | |
| 5,435,672 | A | | 7/1995 | Hall et al. | |
| 5,690,452 | A | | 11/1997 | Baublits | |
| D478,105 | S | | 8/2003 | Morton et al. | |
| 2004/0191015 | A1 | | 9/2004 | Kozak | |
| 2005/0214086 | A1 | * | 9/2005 | Nicholas | 408/204 |
| 2005/0220547 | A1 | | 10/2005 | Jasso | |

FOREIGN PATENT DOCUMENTS

| JP | 2003145330 A | * | 5/2003 |
| JP | 2005144568 A | * | 6/2005 |
| SU | 1235668 A1 | * | 6/1986 |

OTHER PUBLICATIONS

Computer translation of paragraphs [0071-0074] of JP 2005-144568, pp. 34-36 of 44 pages, printed on Oct. 31, 2008.*

* cited by examiner

Primary Examiner—Daniel W Howell

(57) ABSTRACT

A drill plug ejection system includes a drill and a drill bit coupled to the drill. The drill rotates the drill bit. A hole saw is mounted on the drill bit and includes a base wall and a perimeter wall that is attached to and extends away from the base wall. The perimeter wall has an terminal edge defining an opening into the hole saw. The terminal edge comprises saw teeth for cutting into material and removing a plug from the material. A plate has a first side, a second side and a peripheral edge. The plate has an aperture therein extending into the first side and outwardly of second side. The drill bit extends through the aperture and the second side faces the opening of the hole saw. A pair of biasing members is mounted on the plate and bias the plug outwardly of the hole saw.

15 Claims, 3 Drawing Sheets

DRILL PLUG EJECTION SYSTEM

BACKGROUND OF THE INVENTION

Field of the Invention

The present invention relates to drill plug ejection devices and more particularly pertains to a new drill plug ejection device for ejecting a plug of material from a hole saw.

SUMMARY OF THE INVENTION

The present invention meets the needs presented above by generally comprising a drill and a drill bit coupled to the drill. The drill rotates the drill bit when the drill is turned on. A hole saw is mounted on the drill bit and includes a base wall and a perimeter wall that is attached to and extends away from the base wall. The perimeter wall has an terminal edge defining an opening into the hole saw. The terminal edge comprises saw teeth for cutting into material and removing a plug from the material. A plate has a first side, a second side and a peripheral edge. The plate has an aperture therein extending into the first side and outwardly of second side. The drill bit extends through the aperture and the second side faces the opening of the hole saw. A pair of biasing members is mounted on the plate and bias the plug outwardly of the hole saw.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
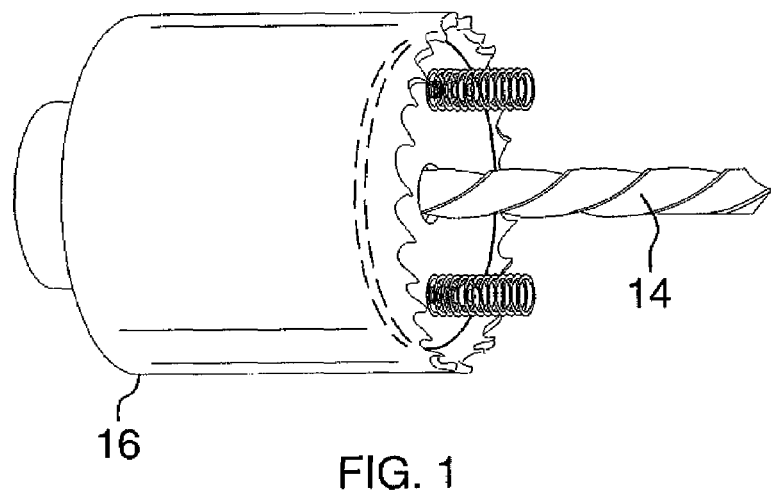
FIG. 1 is a perspective view of a drill plug ejection system according to the present invention.
Figure 2:
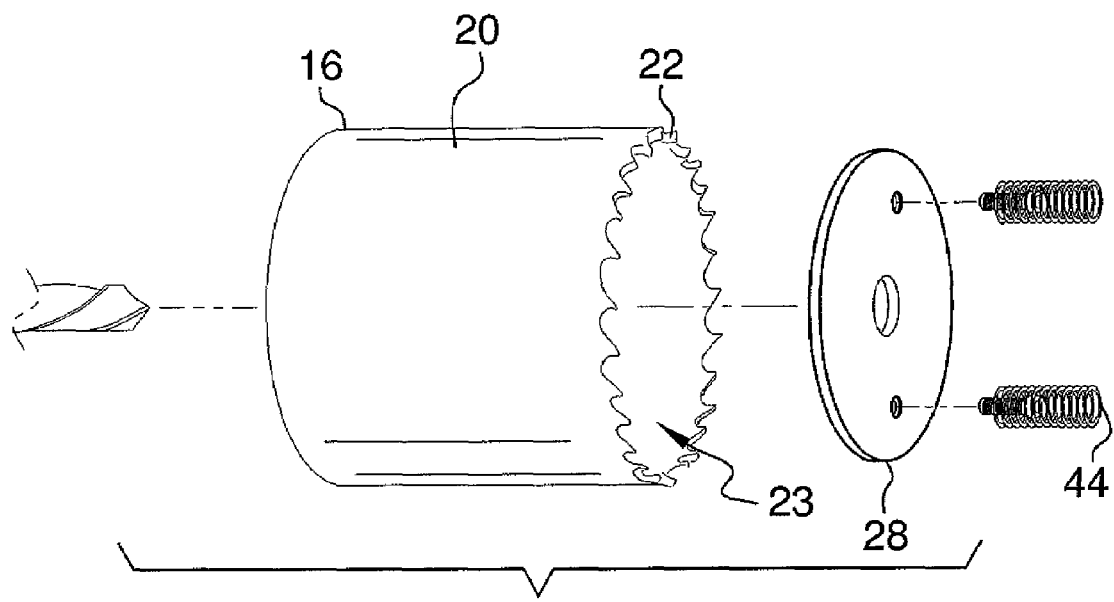
FIG. 2 is a perspective expanded view of the present invention.
Figure 3:
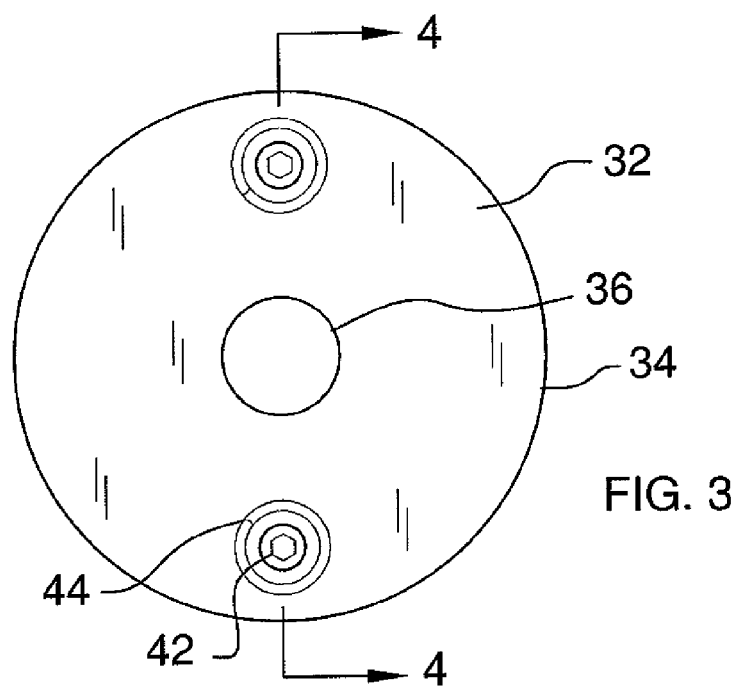
FIG. 3 is a front view of the present invention.
Figure 4:
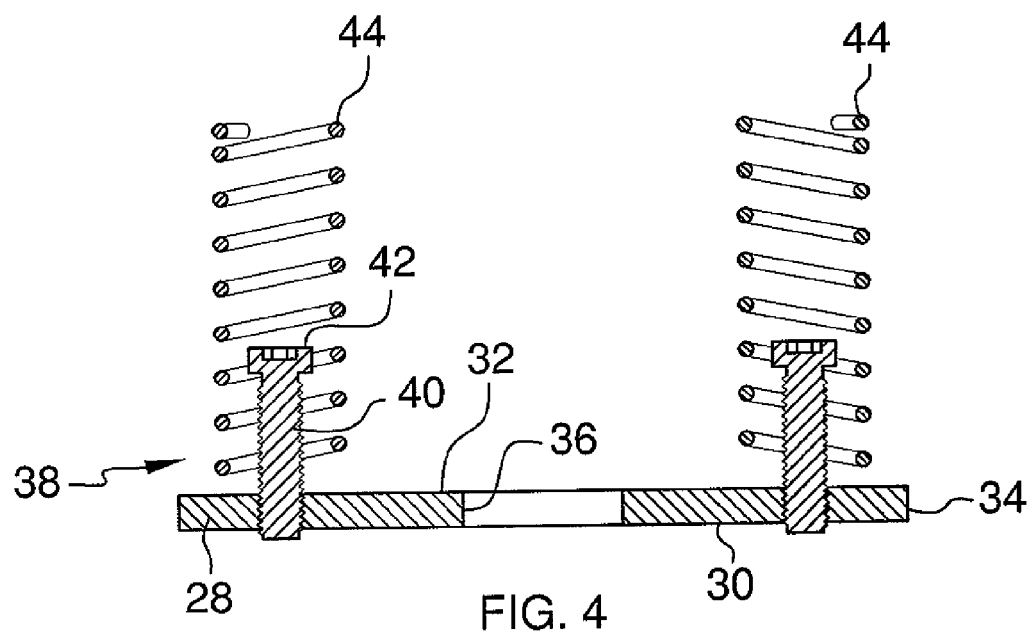
FIG. 4 is a cross-sectional view taken along line 4-4 of FIG. 3 of the present invention.
Figure 5:
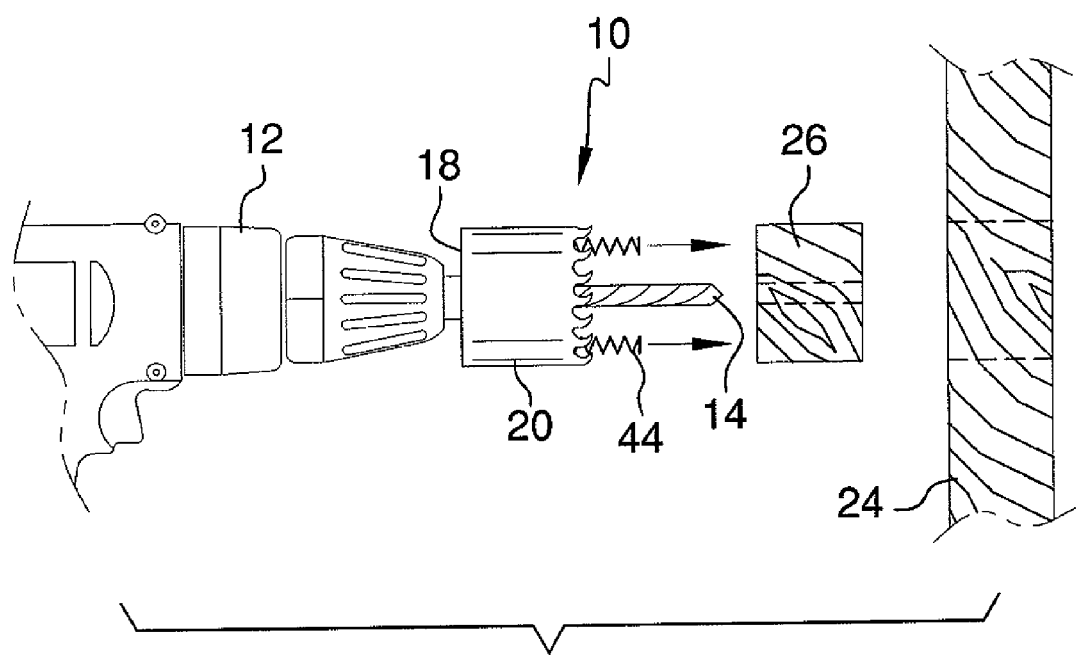
FIG. 5 is a side view of the present invention.

With reference now to the drawings, and in particular to FIGS. 1 through 5 thereof, a new drill plug ejection device embodying the principles and concepts of the present invention and generally designated by the reference numeral 10 will be described.

As best illustrated in FIGS. 1 through 5, the drill plug ejection system 10 generally comprises a drill 12 and a drill bit 14 coupled to the drill 12. The drill 12 rotates the drill bit 14 when the drill 12 is turned on. A conventional hole saw 16 is mounted on the drill bit 14. The hole saw 16 includes a base wall 18 and a perimeter wall 20 that is attached to and extends away from the base wall 18. The perimeter wall 20 has an terminal edge 22 defining an opening 23 into the hole saw. The terminal edge 22 comprises saw teeth for cutting into material 24 and removing a plug 26 from the material 24.

A plate 28 has a first side 30, a second side 32 and a peripheral edge 34. The plate 28 has an aperture 36 therein extending into the first side 30 and outwardly of second side 32. The drill bit 14 extends through the aperture 36. The second side 32 faces the opening 23 of the hole saw 16. The plate 28 has a circular shape and a diameter approximately equal to an inner diameter of the hole saw 16. The plate 28 is rotatable with respect to the drill bit 14.

A pair of biasing members 38 is mounted on the plate 28 and biases the plug 26 outwardly of the hole saw 16. The biasing members 38 are positioned between the aperture 36 and the peripheral edge 34 of the plate 28 so that the aperture 36 is positioned between the biasing members 38. Each of the biasing members 38 comprises a post 40 that is attached to the plate 28 and has a head 42 extending toward the opening 23 of the hole saw 16. The post 40 is threaded and is threadably coupled to the plate 28. A distance between the head 42 and the plate 28 is selectively adjustable. The biasing members 38 each also include a spring 44 that is positioned on a corresponding one of the posts 40 and biases the plug 26 away from the plate 28.

In use, the plate 28 is positioned on drill bit 14. The hole saw 16 is then used in a conventional manner to remove a plug 26 from a portion of material 24. The springs 44 bias the plug 26 outwardly of the hole saw 16 to allow for easy ejection of the plug 28. The posts 40 may be adjusted to allow the plug 26 to enter into the hole saw 16 only a selected distance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plug ejection system comprising:
    a drill and a drill bit coupled to said drill, said drill rotating said drill bit when said drill is turned on;
    a hole saw being mounted on said drill bit, said hole saw including a base wall and a perimeter wall being attached to and extending away from said base wall, said perimeter wall having an terminal edge defining an opening into said hole saw, said terminal edge comprising saw teeth for cutting into material and removing a plug from said material;
    a plate having a first side, a second side and a peripheral edge, said plate having an aperture therein extending into said first side and outwardly of second side, said drill bit extending through said aperture, said second side facing said opening of said hole saw; and
    a pair of biasing members being mounted on said plate and biasing said plug outwardly of said hole saw, each of said biasing members comprising:

a post being attached to said plate and having a head extending toward said opening of said hole saw; and
a spring being positioned on said post, said spring biasing said plug away from said plate.

2. The system according to claim 1, wherein said plate has a circular shape.

3. The system according to claim 2, wherein said plate has a diameter approximately equal to an inner diameter of said hole saw.

4. The system according to claim 1, wherein said plate being rotatable with respect to said drill bit.

5. The system according to claim 1, wherein said biasing members are positioned between said aperture and said peripheral edge of said plate.

6. The system according to claim 5, wherein said aperture is positioned between said biasing members.

7. The system according to claim 1, wherein said posts of said biasing members are threaded and are threadably coupled to said plate, a distance between said heads of said posts and said plate is selectively adjustable.

8. A plug ejection system comprising:
a drill and a drill bit coupled to said drill, said drill rotating said drill bit when said drill is turned on;
a hole saw being mounted on said drill bit, said hole saw including a base wall and a perimeter wall being attached to and extending away from said base wall, said perimeter wall having an terminal edge defining an opening into said hole saw, said terminal edge comprising saw teeth for cutting into material and removing a plug from said material;
a plate having a first side, a second side and a peripheral edge, said plate having an aperture therein extending into said first side and outwardly of second side, said drill bit extending through said aperture, said second side facing said opening of said hole saw, said plate having a circular shape, said plate having a diameter approximately equal to an inner diameter of said hole saw, said plate being rotatable with respect to said drill bit; and
a pair of biasing members being mounted on said plate and biasing said plug outwardly of said hole saw, said biasing members being positioned between said aperture and said peripheral edge of said plate, said aperture being positioned between said biasing members, each of said biasing members comprising;
a post being attached to said plate and having a head extending toward said opening of said hole saw, said post being threaded and being threadably coupled to said plate, a distance between said head and said plate being selectively adjustable;
a spring being positioned on said post, said spring biasing said plug away from said plate.

9. A plug ejection system comprising:
a drill and a drill bit coupled to said drill, said drill rotating said drill bit when said drill is turned on;
a hole saw being mounted on said drill bit, said hole saw including a base wall and a perimeter wall being attached to and extending away from said base wall, said perimeter wall having an terminal edge defining an opening into said hole saw, said terminal edge comprising saw teeth for cutting into material and removing a plug from said material;
a plate having a first side, a second side and a peripheral edge, said plate having an aperture therein extending into said first side and outwardly of second side, said drill bit extending through said aperture, said second side facing said opening of said hole saw, said plate being rotatable with respect to said drill bit; and
a pair of biasing members being mounted on said plate and biasing said plug outwardly of said hole saw.

10. The system according to claim 9, wherein said plate has a circular shape.

11. The system according to claim 10, wherein said plate has a diameter approximately equal to an inner diameter of said hole saw.

12. The system according to claim 9, wherein said biasing members are positioned between said aperture and said peripheral edge of said plate.

13. The system according to claim 12, wherein said aperture is positioned between said biasing members.

14. The system according to claim 9, wherein said pair of biasing members includes;
a pair of posts being attached to said plate, each of said posts and having a head extending toward said opening of said hole saw; and
a pair of springs, each of said posts having one of springs mounted thereon, said springs biasing said plug away from said plate.

15. The system according to claim 14, wherein said posts are threaded and are threadably coupled to said plate, a distance between said heads of said posts and said plate is selectively adjustable.

* * * * *